United States Patent Office 3,174,968
Patented Mar. 23, 1965

3,174,968
21-FLUORO-17α-METHYL-STEROIDS OF THE PREGNANE SERIES AND THEIR PREPARATION
Yvon Lefebvre, Montreal, Quebec, Canada, assignor to American Home Products Corporation, New York, N.Y., a corporation of Delaware
No Drawing. Filed May 24, 1962, Ser. No. 197,252
4 Claims. (Cl. 260—239.55)

The present invention relates to 21-fluoro-17α-methyl-steroids of the pregnane series and to methods for their preparation. Some of the compounds of this invention are, moreover, characterized by carrying additional substituents, preferably halogen, in the 6-position of the pregnane nucleus, and some of them may also possess double bonds in positions 4 and 6.

Some of the compounds of this invention are useful as anti-inflammatory agents, possessing both topical and systemic activity, and others are useful as highly active progestational agents, active by the oral, intramuscular and local routes. Anti-inflammatory activity appears to be limited to the compounds of this invention with pregnenolone-like structure, while progestational activity seems to be inherent in the compounds wtih progesterone-like structure. As progestational agents the compounds of this invention are substantially free from undesirable side-effects. They do not cause masculinization of the fetus, nor do they suppress the normal function of the adrenal gland. They are also useful in maintaining pregnancy, and they show unusually prolonged duration of action.

As orally active progestational agents the compounds of this invention may be administered in dosage forms such as tablets or capsules formulated with excipients such as lactose, starch, magnesium stearate, and the like, the individual dosage forms to contain from 5–50 mg. of the active compound.

For intramuscular administration the compounds of this invention are preferably employed in solution in a pharmaceutically acceptable vegetable oil, in dosages of from 10–50 mg. per injection.

As anti-inflammatory agents the compounds of this invention are distinguished by being substantially free from thymolytic and gluconeogenic activities. They may be used topically in the form of creams, lotions or ointments containing from 0.1 to 2 percent of the active compound. For systemic treatment they may be administered by injection as solutions or suspensions containing from 0.5 to 5 percent of the active compound.

A preferred method of preparing the compounds of my invention comprises the following steps:

17α-methylpregnenolone (I) is condensed with diethyloxalate in dry ethanol and in the presence of sodium ethoxide to obtain 17α-methyl-21-ethoxalylpregnenolone (II). Treatment of the sodium salt of the latter compound with perchloryl fluoride in dry methanol, followed by treatment with potassium acetate to cleave the ethoxalyl side chain results in 21-fluoro-17α-methylpregnenolone (IIIa). The latter compound may be acetylated in the conventional manner with acetic anhydride in pyridine solution to yield the corresponding 3-acetate (IIIb), or it may be subjected to an Oppenauer oxidation utilizing aluminium isopropoxide to yield 21-fluoro-17α-methylprogesterone (IV). The latter compound may be dehydrogenated by heating with chloranil and acetic acid in tert.-butanol solution to yield 6-dehydro-21-fluoro-17α-methylprogesterone (V), and the dienone (V) may be epoxidized by treatment with monoperphthalic acid to yield 21-fluoro-17α-methyl-6α,7α-oxidoprogesterone (VI). The latter epoxide, upon treatment with gaseous hydrogen chloride adds the elements of the latter compound and yields smoothly, with elimination of the elements of water, 6-chloro-6-dehyro-21-fluoro-17α-methylprogesterone (VII).

The following formulae and examples will illustrate my invention:

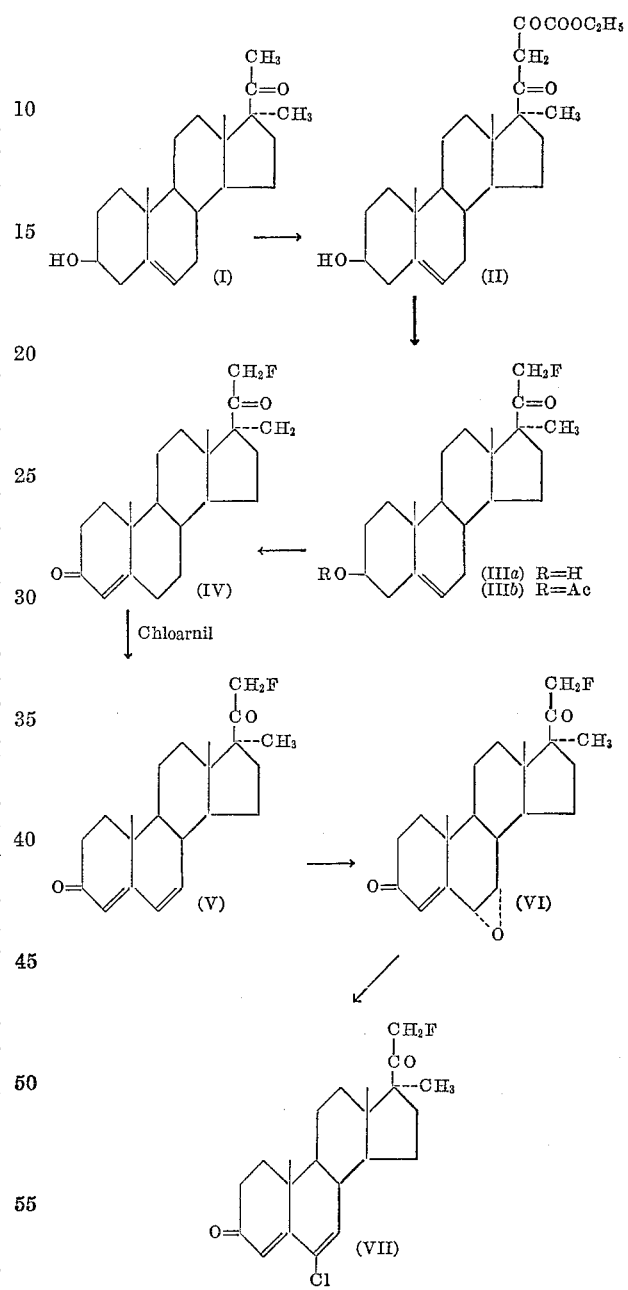

*Example 1*

To sodium ethoxide, prepared from 2.37 g. of sodium in 215 cc. of dry ethanol are added 25 g. of 17α-methylpregnenolone (I) and 35.5 g. of diethyl oxalate dissolved in 30 cc. of ethanol. The mixture is refluxed for six hours and then left standing at room temperature overnight. After thirty minutes of heating a heavy precipitate forms. The precipitate is filtered and washed with ethanol and ether. The salt is then suspended in ether and enough hydrochloric acid is added to dissolve the solid. The ether is washed free of acid, dried and evaporated to dryness, leaving a colourless solid, M.P. 126–

128° C. Crystallization of a sample gives pure 21-ethoxalyl-17α-methylpregnenolone (II), M.P. 137–139° C. λ max.=291 mμ, ε=8,930.

Example 2

To sodium methoxide, prepared from 2.65 g. of sodium and 200 cc. of methanol, 200 cc. of ether are added, followed by 14.5 g. of 21-ethoxyalyl-17α-methylpregnenolone (II) dissolved in 315 cc. of methanol and 440 cc. of ether. Soon after the beginning of the addition a precipitate forms. Stirring is continued for two hours at room temperature. The salt is filtered, washed with ether and dried.

A suspension of 3.08 g. of the above salt in 100 cc. of dry methanol is cooled to −15° to −13° C. Perchloryl fluoride is bubbled through the above suspension for ten minutes, then the cooling bath is removed and the reaction is permitted to proceed at the temperature of a tap water bath until the solution is neutral. The solution at this point is homogeneous. Two-thirds of the volume is evaporated under vacuum and the residue is refluxed for six hours with 6 g. of potassium acetate. After standing overnight at room temperature the mixture is poured into water, and extracted with ether. The ether is washed with water, dried, and evaporated, leaving a practically colourless solid, M.P. 195–199° C. The infra-red spectrum shows OH bands and a carbonyl band at 1720 cm.$^{-1}$ characteristic of a 21-fluoro-17α-methyl-20 ketone, in agreement with the spectrum expected for 21-fluoro-17α-methylpregnenolone (IIIa). Acetylation of the latter compound with acetic anhydride in pyridine, followed by chromatography of the crude product on magnesium silicate and elution with benzene containing 2 percent diethyl ether, yields pure 21-fluoro-17α-methylpregnenolone acetate (IIIb), M.P. 196–198° C. [α]$_D^{24}$ −63.56°.

Example 3

From a mixture of 1.85 g. of 21-fluoro-17α-methylpregnenolone (IIIa), 100 cc. toluene, and 20 cc. cyclohexanone, 15 cc. are distilled to remove the moisture. To the residue, 1 g. of aluminium isopropoxide is added, and the resulting mixture is refluxed for forty-five minutes. Ten millilitres of 10% hydrochloric acid are added and the solution is submitted to a steam distillation. The residue is extracted with methylene chloride. The CH$_2$Cl$_2$ solution is washed free of acid, dried and evaporated, leaving a yellow solid. This is taken up in ether and the insoluble material is filtered, M.P. 173–176° C. Crystallization from acetone-hexane gives 600 mg. 21-fluoro-17α-methylprogesterone (IV), M.P. 176.5–179° C. [α]$_D^{24}$=+95°. Chromatography and crystallization of the mother liquods give the pure compound (IV), M.P. 179–181° C.

Example 4

A mixture of 500 mg. of 21-fluoro-17α-methylprogesterone (IV), 500 mg. of chloranil, 1 cc. of acetic acid, and 25 cc. of tertiary butanol is refluxed under nitrogen for sixteen hours. The solution is cooled and evaporated to dryness. The residue is taken up in benzene. The benzene solution is washed with 5% Na$_2$S$_2$O$_4$ to reduce the unreacted chloranil, then with 5% potassium hydroxide. The heavy precipitate which forms at this point is filtered on celite. The washings with potassium hydroxide are continued until colourless. The benzene solution is washed with water until free of base, dried and evaporated, leaving a solid residue, M.P. 160–165° C. 6-dehydro-21fluoro-17α-methylprogesterone (V) shows a maximum of absorption in the U.V. at 286 mμ with an extinction coefficient of 25,800.

Example 5

To a solution of 2.35 g. of 6-dehydro-21-fluoro-17α-methylprogesterone in 200 cc. of methylene chloride are added 161 cc. of a 0.42 N ethereal solution of monoperphthalic acid. The mixture is left at room temperature for sixty-four hours. The organic solution is washed with sodium bicarbonate, then with water. The dry solution is evaporated to leave a residue which on crystallization with methanol gives 21-fluoro-17α-methyl-6α,7α-oxidoprogesterone (VI), M.P. 200–203° C. The ultraviolet spectrum shows a maximum of absorption at 242 mμ with an extinction coefficient of 16,200.

Example 6

Hydrogen chloride is bubbled through a solution of 628 mg. of 21-fluoro-17α-methyl-6α,7α-oxidoprogesterone (VI) in 25 cc. of glacial acetic acid until the solution is saturated. The mixture is left at room temperature for four hours. Dilution with ice-water gives a solid, which is filtered, washed free of acid, and dried. The residue is crystallized from ether and then from acetone-hexane to give pure 6-chloro-6-dehydro-21-fluoro-17α-methylprogesterone (VII), M.P. 178–180° C. The ultraviolet spectrum shows a maximum of absorption at 287 mμ with an extinction coefficient of 21,100.

I claim:
1. 6 - chloro-6-dehydro-21-fluoro-17α-methylprogesterone.
2. 6-dehydro-21-fluoro-17α-methylprogesterone.
3. 21-fluoro-17α-methyl-6α,7α-oxidoprogesterone.
4. The process which comprises condensing 17α-methylpregnenolone with diethyl oxalate in dry ethanol and in the presence of sodium ethoxide, thereby obtaining 17α-methyl-21-ethoxalyl-pregnenolone; converting said latter compound to its sodium salt and treating said salt with perchloryl fluoride in dry methanol, thereby introducing a 21-fluoro substituent; heating with potassium acetate in order to remove said 21-ethoxalyl group, thus securing 21-fluoro-17α-methylpregnenolone; heating said latter compound with aluminum isopropoxide, thereby oxidizing the 3-hydroxyl group and securing 21-fluoro-17α-methylprogesterone; dehydrogenating said last-named compound by treatment thereof with chloranil, thereby securing 6-dehydro-21-fluoro-17α-methylprogesterone; treating said last-named compound with monoperphthalic acid, thereby securing 21 - fluoro-17α-methyl-6α,7α-oxidoprogesterone; and treating said last-named epoxide compound with gaseous hydrogen chloride, thereby securing 6-chloro-6-dehydro-21-fluoro-17α-methylprogesterone.

References Cited in the file of this patent
UNITED STATES PATENTS
2,601,168    Plattner et al.            June 17, 1952

OTHER REFERENCES
Herrn et al.: Chem. Ber., vol. 88, 1955, pp. 878–883.
Tannhauser et al.: J.A.C.S., vol. 78, 1956, pp. 2658–2659.
Kissman et al.: J.A.C.S., vol. 82, 1960, pp. 2312–2317.